(12) United States Patent
Takenaka

(10) Patent No.: US 12,498,467 B2
(45) Date of Patent: Dec. 16, 2025

(54) DISTANCE-MEASURING APPARATUS AND DISTANCE-MEASURING METHOD

(71) Applicant: Hirokazu Takenaka, Kanagawa (JP)

(72) Inventor: Hirokazu Takenaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 817 days.

(21) Appl. No.: 17/794,635

(22) PCT Filed: Mar. 9, 2021

(86) PCT No.: PCT/IB2021/051925
§ 371 (c)(1),
(2) Date: Jul. 22, 2022

(87) PCT Pub. No.: WO2021/186289
PCT Pub. Date: Sep. 23, 2021

(65) Prior Publication Data
US 2023/0048328 A1    Feb. 16, 2023

(30) Foreign Application Priority Data

Mar. 18, 2020  (JP) .................................. 2020-048495
Jan. 19, 2021  (JP) .................................. 2021-006693

(51) Int. Cl.
*G01S 7/493*   (2006.01)
*G01S 7/4915*  (2020.01)
*G01S 17/36*   (2006.01)

(52) U.S. Cl.
CPC ............ *G01S 7/493* (2013.01); *G01S 7/4915* (2013.01); *G01S 17/36* (2013.01)

(58) Field of Classification Search
None
See application file for complete search history.

(56) References Cited

U.S. PATENT DOCUMENTS

| 7,791,715 B1 | 9/2010 | Bamji |
| 2006/0114333 A1 | 6/2006 | Gokturk et al. |

(Continued)

FOREIGN PATENT DOCUMENTS

| CN | 107302668 A | 10/2017 |
| CN | 110023785 A | 7/2019 |

(Continued)

OTHER PUBLICATIONS

Office Action issued Mar. 13, 2025 in Chinese Patent Application No. 202180021881.3, 4 pages.

(Continued)

*Primary Examiner* — Hovhannes Baghdasaryan
(74) *Attorney, Agent, or Firm* — XSENSUS LLP

(57) ABSTRACT

A distance-measuring apparatus includes a light emitter to emit light with modulated frequency to an object, a light receiver to receive the light that is emitted from the light emitter and returns as reflected by the object, and a controller to measure, based on radiation intensity of received light by the light receiver, a length of time between a time at which the light is emitted by the light emitter and a time at which the light is received by the light receiver to obtain a distance to the object. The controller performs a first measurement in which the light emitter emits the light at a first modulation frequency to measure the length of time by the time at which the light is received by the light receiver a first plurality of times.

12 Claims, 5 Drawing Sheets

(56) References Cited

U.S. PATENT DOCUMENTS

| | | |
|---|---|---|
| 2006/0197937 A1 | 9/2006 | Bamji et al. |
| 2007/0158533 A1 | 7/2007 | Bamji et al. |
| 2017/0261611 A1 | 9/2017 | Takahashi et al. |
| 2020/0301010 A1 | 9/2020 | Takenaka |
| 2020/0301011 A1 | 9/2020 | Niinami et al. |

FOREIGN PATENT DOCUMENTS

| | | | |
|---|---|---|---|
| CN | 110441786 | A | 11/2019 |
| CN | 110876006 | A | 3/2020 |
| JP | H04-159528 | A | 6/1992 |
| JP | 2012-225807 | | 11/2012 |
| JP | 2013-538342 | A | 10/2013 |
| JP | 2016-099233 | A | 5/2016 |
| JP | 2020-153796 | | 9/2020 |
| KR | 10-2019-0127870 | A | 11/2019 |
| WO | WO2012/012607 | A2 | 1/2012 |
| WO | 2018/175344 | A1 | 9/2018 |

OTHER PUBLICATIONS

Office Action issued May 15, 2024 in Chinese Patent Application No. 202180021881.3, 11 pages.
Action issued Jan. 20, 2025 in Korean Patent Application No. 10-2022-7030579, 10 pages.
Office Action issued Jun. 11, 2024 in Japanese Patent Application No. 2021-006693, 10 pages.
International Search Report issued on May 19, 2021 in PCT/IB2021/051925 filed on Mar. 9, 2021. 11 pages.

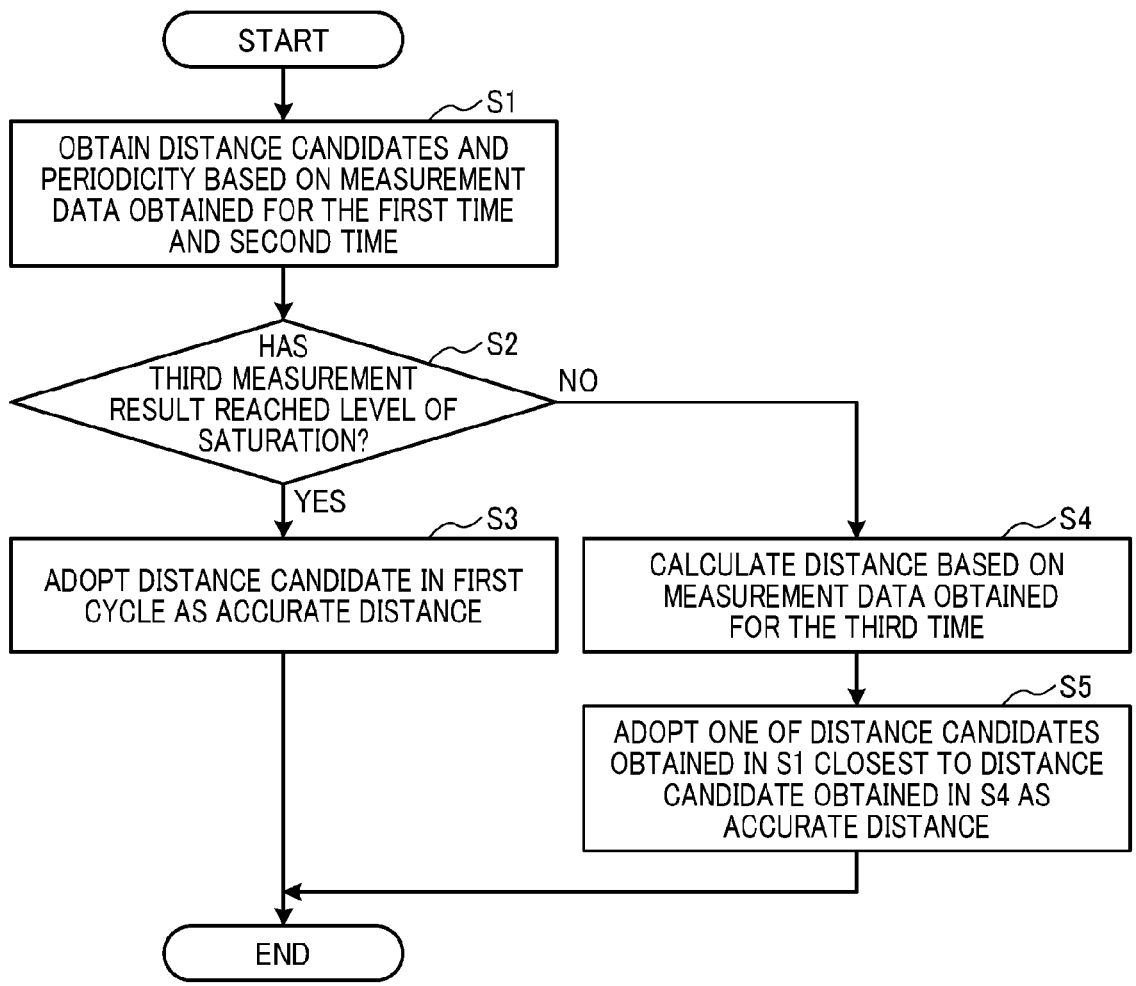

DISTANCE-MEASURING APPARATUS AND DISTANCE-MEASURING METHOD

CROSS-REFERENCE TO RELATED APPLICATIONS

The present application is based on PCT filing PCT/IB2021/051925, filed Mar. 9, 2021, which claims priority to Japanese Patent Application No. 2020-048495, filed Mar. 18, 2020 and Japanese Patent Application No. 2021-006693 filed Jan. 19, 2021, the entire contents of each of which is incorporated herein by reference.

TECHNICAL FIELD

Embodiments of the present disclosure relate to a distance-measuring apparatus and a distance-measuring method.

BACKGROUND ART

As a method of measuring the distance between a distance-measuring apparatus and an object, technologies to irradiate an object with light to calculate the distance to the object based on the time difference between the emitted light and the light reflected by the object, which are called time-of-flight (TOF) method, are known in the art. The infrared light is modulated on modulation frequencies above a few megahertz (MHz), and the modulated infrared light in a waveform such as a sinusoidal wave, a square wave, or a rectangular wave is emitted to an object. Time-of-flight (TOF) cameras that adopts the distance measurement in which the phase detection is used are known in the art. In other words, in such TOF cameras, the phase of the light that returns as reflected by the object is measured by the multiple light-receiving elements, and the time difference is calculated based on the obtained phase. Finally, the distance to the object is obtained. When the TOF method is adopted and the distance is to be measured with a high degree of precision, it is effective to increase the modulation frequency of the light. Theoretically, if the modulation frequency is doubled, the variations in distance measurement can be reduced to the half. However, in the distance measurement in which the phase detection is used, some indistinguishability or ambiguity due to the periodicity of a phase, which is called aliasing in the description of the present disclosure, may occur.

A time-of-flight (TOF) system in which the phase data is obtained using a plurality of modulation frequencies for the irradiation light (see, for example, PTL 1). Moreover, in such a TOF system, the phase data that are obtained based on the multiple modulation frequencies are combined to balance the noise in the phase data. Due to such a configuration, as known in the art, the aliasing can be reduced, and the distance can be measured with precision.

CITATION LIST

Patent Literature

[PTL 1]
Japanese Patent Application Publication No. 2012-225807

SUMMARY OF INVENTION

Technical Problem

Due to the technologies known in the art (see, for example, PTL 1), the aliasing can be reduced.

However, when both an object with a low reflectance ratio at a long distance and an object with a high reflectance ratio at a short distance exist on the same scene, the dynamic range of the imaging device may go beyond its limit unintentionally.

Solution to Problem

A distance-measuring apparatus includes a light emitter configured to emit light with modulated frequency to an object, a light receiver configured to receive the light that is emitted from the light emitter and returns as reflected by the object, and a controller configured to measure, based on radiation intensity of received light by the light receiver, a length of time between a time at which the light is emitted by the light emitter and a time at which the light is received by the light receiver to obtain a distance to the object. The controller is configured to perform a first measurement in which the light emitter is made emit the light at a first modulation frequency to measure the length of time by the time at which the light is received by the light receiver a first plurality of times, and the controller is configured to perform a second measurement in which the light emitter is made emit the light at a second modulation frequency lower than the first modulation frequency to measure the length of time by the time at which the light is received by the light receiver a second plurality of times fewer than the first plurality of times. The controller is configured to calculate the distance to the object based on the length of time obtained in the first measurement and the length of time obtained in the second measurement.

Advantageous Effects of Invention

According to one aspect of the present disclosure, both reduction in aliasing and the securing of dynamic range can be achieved.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 7 is a diagram illustrating the procedure of calculating a distance based on a result of measurement with a high degree of precision, according to an embodiment of the present disclosure.

DESCRIPTION OF EMBODIMENTS

Embodiments

Figure 1:
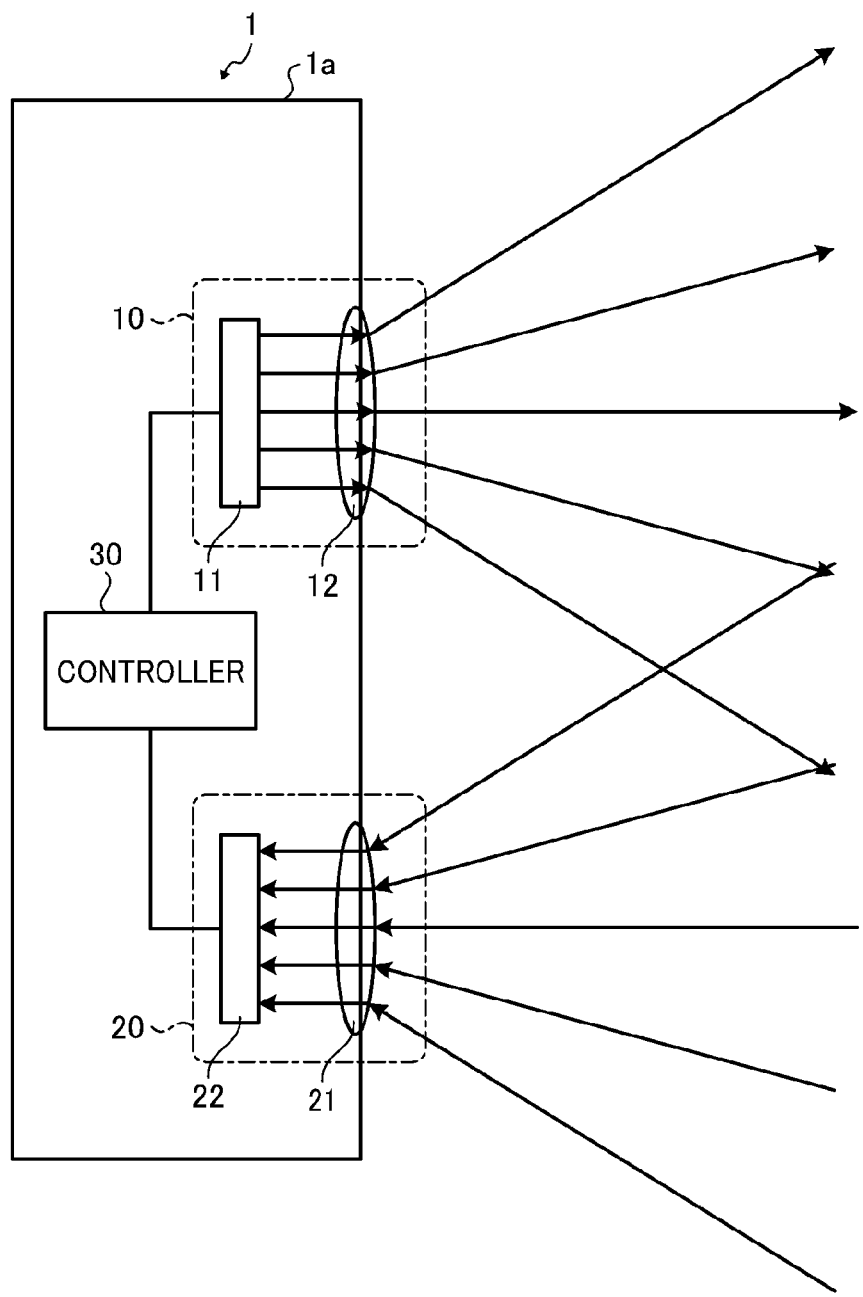
FIG. 1 is a diagram illustrating a hardware configuration of a distance-measuring apparatus according to an embodiment of the present disclosure.

A distance-measuring apparatus according to an embodiment of the present disclosure adopts a time-of-flight (TOF) method to measure the distance to an object. In the time-of-flight method, light is emitted to an object, and the distance is calculated based on the time difference with the light reflected by the object. In the distance-measuring apparatus, after the infrared light whose radiation intensity has been modified based on predetermined radiation patterns is emitted from a light source to an object, the light that is reflected by the object is received by a light-receiving element to be used for infrared light. In the distance-measuring apparatus, the distance is calculated and obtained as the time difference between the time of emission and the time of light reception is detected on a pixel-by-pixel basis based on predetermined radiation patterns for infrared light. In the distance-measuring apparatus, the calculated and obtained distance values are collected in the bitmap format on a pixel-by-pixel basis, and are stored as a distance image. The distance-measuring apparatus that adopts such methodology is called TOF camera.

More specifically, in the distance-measuring apparatus according to the present embodiment, the infrared light is modulated on modulation frequencies above a few megahertz (MHz), and the modulated infrared light in a waveform such as a sinusoidal wave, a square wave, or a rectangular wave is emitted to an object. Then, in the distance-measuring apparatus, the phase of the light that returns as reflected by the object is measured by the multiple light-receiving elements, and the time difference is calculated based on the obtained phase. Finally, the distance to the object is obtained. The distance-measuring apparatus that adopts such methodology is called phase detection TOF camera.

When measurement is to be performed for a wide range in a TOF camera, the dynamic range of a scene may matter. The radiation intensity of light needs to be increased or the exposure time needs to be increased in order to measure the distance to an object at a long distance. However, if the distance to an object at a short distance is measured under such conditions, the radiation intensity of received light may increase to an excessive degree, and may unintentionally exceed the capacity of the imaging device and reach a level of saturation. Further, the radiation intensity of received light varies depending on the reflectance ratio of the object. Accordingly, when both an object with a low reflectance ratio at a long distance and an object with a high reflectance ratio at a short distance exist on the same scene, the dynamic range of the imaging device may go beyond its limit, and there may be some cases in which the distance to the object with a low reflectance ratio at a long distance and the distance to the object with a high reflectance ratio at a short distance cannot be measured at the same time.

Moreover, when measurement is to be performed with a high degree of precision in a TOF camera, aliasing may matter. When it is desired that the measurement be performed with a high degree of accuracy, it is effective to increase the modulation frequency of the light. Theoretically, if the modulation frequency is doubled, the variations in distance measurement can be reduced to the half. On the other hand, a phase has a periodicity of $2\pi$ in the distance measurement in which the phase detection is used, and thus when the distance is measured based on the detected phase, the obtained distance may become indistinguishable due to the periodicity of a phase. For example, when the light with the modulation frequency of 10 MHz is used for distance measurement, the distance equivalent to one cycle of the phase is about 15 meters (m). As a result, some indistinguishability or ambiguity remains in the cycle of 15 m. In other words, when $\pi$ is obtained as a result of phase detection, the distance may be "7.5+15×n" [m], where n is a positive integer. Such indistinguishability or ambiguity due to the periodicity of a phase is called aliasing in the description of the present disclosure.

In order to achieve both measurement with a wide range and measurement with a high degree of precision in TOF cameras, it is desired that both the matter of dynamic range and the matter of aliasing be dealt with and solved.

In order to handle such a situation, the distance-measuring apparatus 1 according to the present embodiment adopts a pair of modes including a high-frequency modulation mode and a low-frequency modulation mode. In the high-frequency modulation mode, measurement is performed a plurality of times with variable exposure time or intensity of light. On the other hand, in the low-frequency modulation mode, measurement is performed for an exposure time longer than the maximum exposure time in the high-frequency modulation mode. Alternatively, in the low-frequency modulation mode, measurement is performed with radiation intensity of light higher than the maximum radiation intensity of light. Due to such configurations as described above, both reduction in aliasing and increment in dynamic range can be achieved.

More specifically, the distance-measuring apparatus adopts a pair of modes including a high-frequency modulation mode and a low-frequency modulation mode, and performs two kinds of measurement including the measurement using high-frequency modulated light and the measurement using low-frequency modulated light. In the high-frequency modulation mode, the distance-measuring apparatus performs measurement a plurality of times with variable exposure time or intensity of light. Due to such a configuration, measurement can be done with a high degree of precision while maintaining the wide dynamic range for the signals. Moreover, in the low-frequency modulation mode, the distance-measuring apparatus performs measurement for an exposure time longer than the maximum exposure time in the high-frequency modulation mode. Alternatively, in the low-frequency modulation mode, the distance-measuring apparatus 1 performs measurement with radiation intensity of light higher than the maximum radiation intensity of light. As a result, the number of times measurement is performed in the low-frequency modulation mode becomes fewer than the number of times measurement is performed in the high-frequency modulation mode. For example, aliasing avoidance in response to the results of the measurement that is performed at a high-frequency modulation mode a plurality of times is done by the measurement that is performed one time at a low-frequency modulation mode. Due to such a configuration, the aliasing that is included in such results of measurement can be reduced. As a result, both reduction in aliasing and increment in dynamic range can be achieved.

In particular, the distance-measuring apparatus 1 may be configured as illustrated in FIG. 1. FIG. 1 is a diagram illustrating a hardware configuration of the distance-measuring apparatus 1, according to the present embodiment. More specifically, as a configuration or structure of the distance-measuring apparatus 1, FIG. 1 illustrates a configuration or structure in which a plurality of fish-eye TOF cameras whose full angles of view are wider than 180 degrees are combined to implement an omnidirectional TOF camera.

In the distance-measuring apparatus 1, the modulated light (irradiation light) that is modulated to the degree of several MHz or more with a square wave, a rectangular wave, or a sinusoidal wave is emitted to an object whose distance is to be measured, and the modulated light (reflected light) that hit the object and then reflected by the object is received to measure its radiation intensity of light. As illustrated in FIG. 1, the distance-measuring apparatus 1 according to the present embodiment includes, for example, a light emitter 10, a light receiver 20, and a controller 30.

The light emitter 10 receives a modulating signal from a controller 30. Such a modulating signal may be a rectangular wave or a sinusoidal wave that is modulated to the degree of several MHz or more. The light emitter 10 emits, based on the modulating signal, the modulated light (irradiation light) to an object whose distance is to be measured. Such modulated light is modulated based on the modulating signal. The light emitter 10 includes a light source 11 and a lens 12. The light source 11 may be implemented as a vertical-cavity surface-emitting laser (VCSEL) two-dimensional array. The lens 12 increases the angles of view of the modulated light that is emitted from the light source 11 to a desired angle, and emits it to the object. The light source 11 is accommodated inside a housing 1a of the distance-measuring apparatus 1, and the lens 12 is exposed to a surface of the housing 1a.

The light receiver 20 receives the modulated light (reflected light) that hit the object and then reflected by the object, and supplies the controller 30 with a signal according to the light-receptive intensity. The light receiver 20 includes a lens 21 and a light-receptive sensor 22. The light-receptive sensor 22 may be implemented as a TOF sensor in which a plurality of light-receiving elements are arranged as a two-dimensional array. The lens 21 concentrates the modulated light that hit the object and then reflected by the object on the photo-sensing surface of the light-receptive sensor 22. The light-receptive sensor 22 generates a signal for each one of the light-receiving elements according to the light-receptive intensity, and supplies the controller 30 with the generated signals. The lens 21 is exposed to a surface of the housing 1a, and the light-receptive sensor 22 is accommodated inside the housing 1a.

The controller 30 controls, for example, the light-emitting patterns and the light-emitting timings of the light source 11 of the light emitter 10, and controls for example, the times or timings at which the light is received of the light-receptive sensor 22 of the light receiver 20, in synchronization with the control of the light emitter 10. The controller 30 measures the phase of the light that returns as reflected by the object based on the signals that are obtained by each one of the light-receiving elements and are supplied from the light-receptive sensor 22, and calculates the time difference based on the obtained phase. As a result, the distance to an object is obtained. For example, the controller 30 according to the present embodiment is implemented by a central processing unit (CPU), and is accommodated inside the housing 1a.

Figure 2:
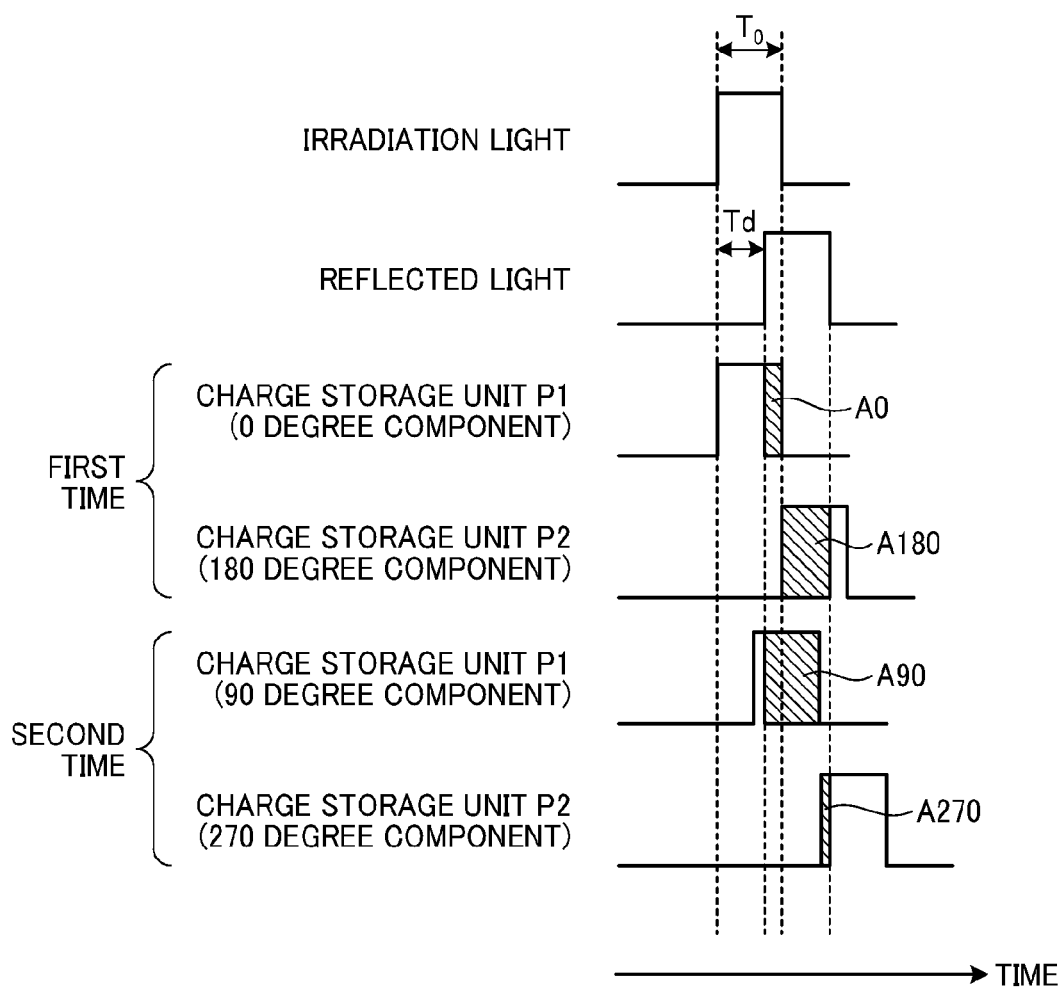
FIG. 2 is a diagram illustrating the principle of how the distance is calculated and obtained by a distance-measuring apparatus, according to an embodiment of the present disclosure.

The principle of how the distance is calculated and obtained by the distance-measuring apparatus 1 according to the present embodiment is described below with reference to FIG. 2. FIG. 2 is a diagram illustrating the principle of how the distance is calculated and obtained by the distance-measuring apparatus 1, according to the present embodiment.

The distance-measuring apparatus 1 according to the present embodiment is a time-of-flight (TOF) camera that perform phase detection. The distance-measuring apparatus 1 has a pair of charge storage units P1 and P2 for each one of the light-receiving elements, and can speedily determine and switch to which one of the pair of charge storage units P1 and P2 the electrical charge is to be stored. Such a pair of charge storage units P1 and P2 are configured such that the electrical charge can be accumulated in an independent manner from each other. Due to such a configuration, a pair of phase signals that are completely opposite to one square wave or rectangular wave can be detected at the same time. For example, a combination of 0 degree and 180 degrees or a combination of 90 degree and 270 degrees can be detected at the same time. In other words, the distance can be measured based on the irradiating or light-receptive processes that are performed at least two times.

FIG. 2 is a graph of the timing at which each one of the pair of charge storage units P1 and P2 accumulates the electric charge in response to the irradiation light and reflected light, and electrical charge is accumulated as indicated by hatched areas. In the present embodiment, the irradiation light indicates the modulated light that is emitted from the light emitter 10 to the object whose distance is to be measured. In the present embodiment, the reflection light indicates the modulated light that is reflected by the object whose distance is to be measured and received by the light receiver 20. However, in actuality, irradiation is not performed with one-time rectangular wave in order to increase the amount of accumulated electrical charge. Instead, repeated patterns of a rectangular wave with the duty of 50% are performed, and the charge storage units P1 and P2 are repeatedly switched accordingly.

The electrical charge that corresponds to the reflection light is accumulated based on the exposure times that temporally correspond to 0°, 90°, 180°, and 270°, respectively, with reference to the pulse cycle of the irradiation light. As a result, the four phase signals of A0, A90, A180, and A270 are obtained. In other words, the four phase signals of A0, A90, A180, and A270 are the phase signals that are temporally divided into four phases of 0°, 90°, 180°, and 270°. Accordingly, the controller 30 can compute a phase difference angle φ using the first equation given below.

First Equation $$\varphi = \mathrm{Arctan}\{(A90-A270)/(A0-A180)\} \quad \text{[Math. 1]}$$

The controller 30 according to the present embodiment can compute a delay time Td using phase difference angle φ, based on the second equation given below.

Second Equation $$Td = \{\varphi/(2\pi)\} \times T \quad \text{[Math. 2]}$$

When it is assumed that the pulse width of the irradiation light is $T_0$ in the second equation, $T=2T_0$. The controller 30 according to the present embodiment can compute the distance value D of the distance to an object using the delay time Td obtained in the second equation and the speed of light C, based on the third equation given below.

Third Equation $$D = Td \times C/2 \quad \text{[Math. 3]}$$

Figure 3:
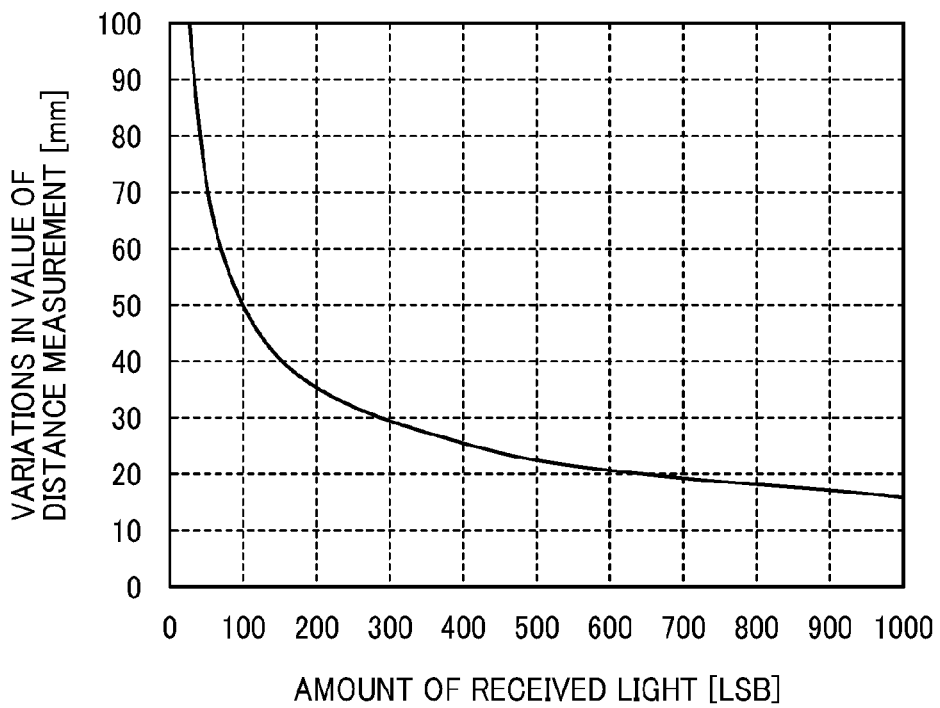
FIG. 3 is a diagram illustrating the relation between the radiation intensity of received light and the precision of distance measurement, according to an embodiment of the present disclosure.

The relation between the radiation intensity of light received by the light receiver 20 and the precision of distance measurement by the controller 30 is described below with reference to FIG. 3. FIG. 3 is a diagram illustrating the relation between the amount of received light and the accuracy of distance measurement, according to the present embodiment. In FIG. 3, the vertical axis indicates the precision of distance measurement by the variations in value of distance measurement, and indicates a higher accuracy in distance measurement as the value is smaller. In FIG. 3, the horizontal axis indicates the radiation intensity of light received by the light receiver 20.

In FIG. 3, it is assumed that the waveform of the light that is emitted from the light emitter 10 is a rectangular wave at the modulation of 50 MHz. As the radiation intensity of light received by the light receiver 20 increases, the variations in value of distance measurement decreases, and the precision of distance measurement improves. Assuming that the accuracy specification of the TOF camera is to be kept equal to or less than 50 mm in the present embodiment, as understood from the graph of FIG. 3, the valid range of the radiation intensity of received light needs to be within the range from 100 LSB to 1000 LSB in digital value. If the valid range of the radiation intensity of received light is less than 100 LSB, the variations in value of distance measurement unintentionally become equal to or greater than 50 mm. If the valid range of the radiation intensity of received light exceeds 1000 LSB, the pair of charge storage units P1 and P2 of each one of the multiple light-receiving elements may unintentionally exceed the capacity and reach a level of saturation. In other words, the dynamic range is ten times between 100 LSB and 1000 LSB.

Figure 4:
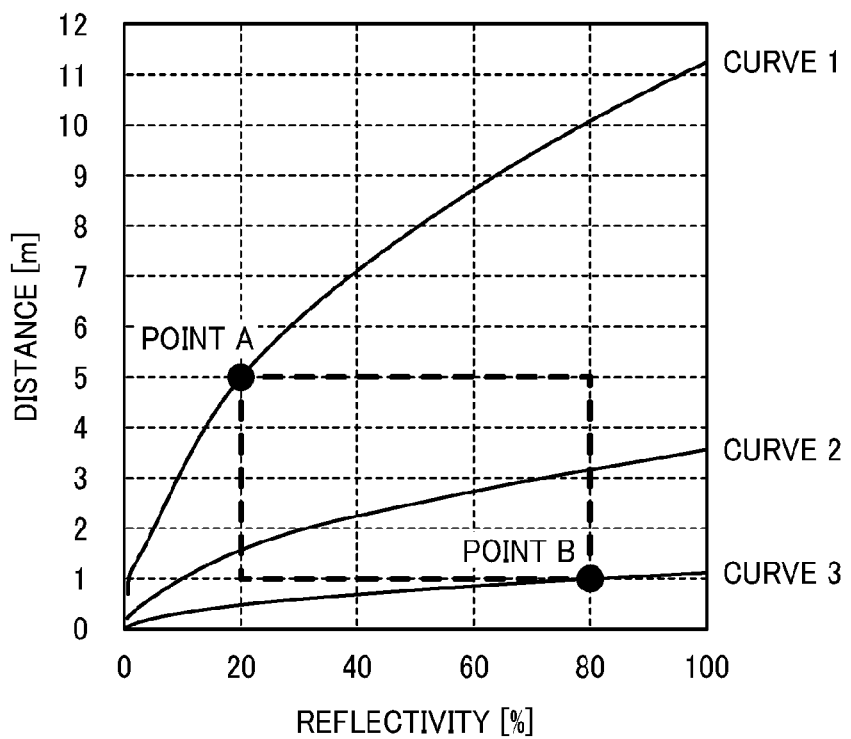
FIG. 4 is a diagram illustrating the high dynamic range measurement according to an embodiment of the present disclosure.

The high dynamic range measurement is described below with reference to FIG. 4. FIG. 4 is a diagram illustrating the high dynamic range measurement according to the present embodiment.

In the present specific embodiment, it is assumed that the range for which distance is to be measured is 1 to 5 m and the range of reflectance ratio is 20 to 80%. As known in the art, the radiation intensity of received light is inversely proportional to the square of the distance to an object, and is proportional to the reflectance ratio of the object. In other words, the radiation intensity of received light is proportionate to "(Reflectance Ratio)/(Distance)$^2$."

On the other hand, in the present embodiment, the radiation intensity of received light is also proportionate to the exposure dose. The exposure dose is a controllable parameter, and is changed by varying the exposure time that corresponds to the irradiation time or by varying the amplitude of a square wave, rectangular wave, or a sinusoidal wave.

In short, the radiation intensity of received light is proportionate to "(Exposure Dose)×(Reflectance Ratio)/(Distance)$^2$."

In view of the dynamic range, i.e., the valid range of the radiation intensity of received light, the valid range of the radiation intensity of received light needs to be $5^2=25$ times in order to cover the range, and the valid range of the radiation intensity of received light needs to be 4 times in order to cover the range of reflectance ratio. In other words, as a whole, the dynamic range needs to be 25×4=100 times. Such a range is referred to as the dynamic range of a scene in the following description of the present disclosure.

As described above, the dynamic range of the TOF camera is ten times. Accordingly, a desired dynamic range of a scene, i.e., 100 times, cannot be satisfied. However, if a method in which the exposure time of the TOF camera is changed and capturing operation is performed a plurality of times is adopted, the dynamic range can be increased can go beyond the dynamic range of ten times per one capturing operation. Note also that the exposure time indicates the length of time during which the modulated irradiation light as illustrated in FIG. 2 is continuously emitted with a predetermined frequency. In other words, it is assumed in the present embodiment that the exposure time is equivalent to the length of time during which the light emitter 10 emits light.

Firstly, the distance is measured for the first time upon setting the exposure time such that the reflection light can be received with 100 LSB under the condition in which the distance is longest and the reflectance ratio is low, i.e., the condition in which the distance is 5 m and the reflectance ratio is 20%, which corresponds to a point A in FIG. 4. For example, it is assumed that the exposure time is 1 milliseconds (msec). In this configuration, a curve 1 that passes a point A in FIG. 4 indicates the conditions for the radiation intensity of received light to be 100 LSB. Moreover, a curve 2 in FIG. 4 indicates the conditions for the radiation intensity of received light to be 1000 LSB with the same exposure time. In other words, the region bounded by the curve 1 and the curve 2 can be measured in the distance measurement performed for the first time.

Secondly, the exposure time is reduced by one-tenth to 0.1 msec and the distance measurement is performed for the second time. In such second distance measurement, the radiation intensity of received light is also reduced by one-tenth, and the curve 2 indicates the conditions for the radiation intensity of received light to be 100 LSB. In other words, the conditions for the radiation intensity of received light to be 100 LSB in the second distance measurement are equivalent to the conditions for the radiation intensity of received light to be 1000 LSB in the first distance measurement. Moreover, in the present embodiment, a curve 3 indicates the conditions for the radiation intensity of received light to be 1000 LSB in the second distance measurement, and the curve 3 passes through a point B in FIG. 4 where the distance to the closest object with the highest reflectance ratio is supposed to be measured. In other words, the region bounded by the curve 2 and the curve 3 can be measured in the distance measurement performed for the second time.

As described above, the region bounded by the curve 1 and the curve 3 can be measured in the measurement that is performed two times with varying exposure times. As a result, the measurement in the present embodiment can cover the to-be-measured rectangular region that is bounded by the dotted lines as illustrated in FIG. 4.

In the present embodiment, it is configured such that the conditions for the highest radiation intensity of received light (1000 LSB) in the first measurement and the conditions for the lower-limit radiation intensity of received light (100 LSB) in the second measurement match one another. However, no limitation is indicated thereby, and it may be configured such that some of the range in the first measurement overlaps with the range in the second measurement to implement some robustness depending on the dynamic range of the light receiver 20, the range in which distance measurement is to be performed, and the range of reflectance ratio. When the range of distance or the range of reflectance ratio is wide compared with the dynamic range of the light receiver 20, a desired range of measurement may be covered by performing measurement three times or more.

Figure 5:
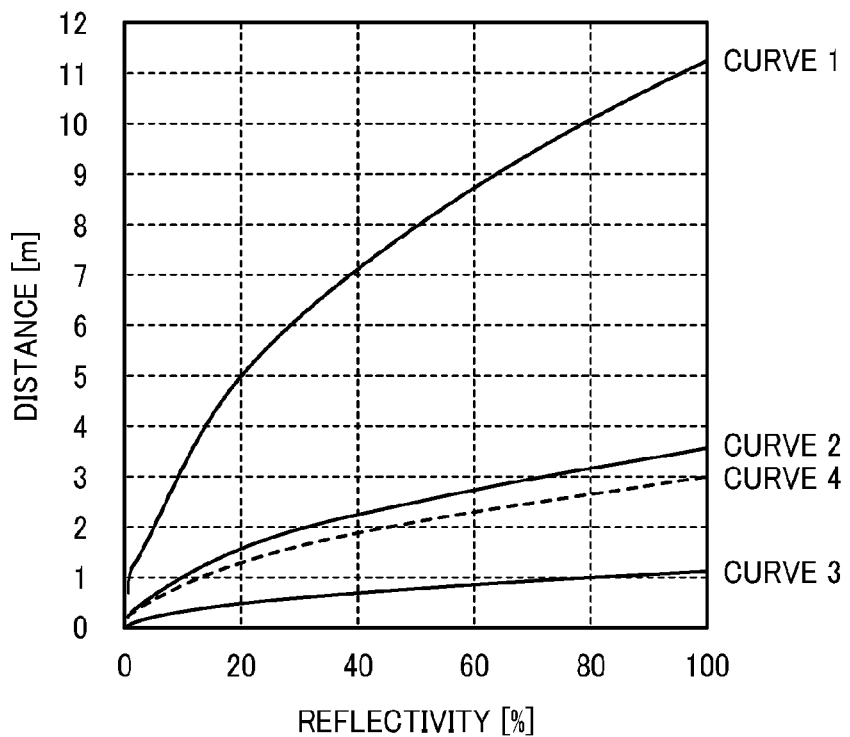
FIG. 5 is a diagram illustrating a measurement sequence according to an embodiment of the present disclosure.

The measurement sequence that is used to avoid aliasing is described below with reference to FIG. 5. FIG. 5 is a diagram illustrating a measurement sequence according to the present embodiment.

In order to measures the distance with a high degree of precision, it is effective to increase the modulation frequency of the irradiation light. Assuming that the resolution of the detection phase is fixed, theoretically, the range resolution may be also doubled if the modulation frequency is doubled, in view of the fourth equation given below.

Fourth Equation $$D=(C/2)\times\{\varphi/(2\pi f)\}$$

In the above fourth equation, D, C, f and φ indicate the distance, the speed of light, the modulation frequency, and the detection phase, respectively. Note that the distance measurement in which the detection is performed with the phase φ has the voluntariness at the cycle of $2\pi$. Such a relation is indicated as follows.

$$0 \leq \varphi < 2\pi$$

Assuming that k is a desired positive integer, the fourth equation can be modified as in the fifth equation given below.

Fifth Equation $$D=(C/2)\times\{\varphi/(2\pi f)\}+(C/2)\times(k/f) \qquad \text{[Math. 5]}$$

As indicated by the above fifth equation, when measurement is to be performed for a wide range and such a wide range exceeds the distance (C/2f), it becomes difficult to determine a unique value for the distance D. Such a phenomenon is called aliasing.

For example, when the modulation frequency is at 50 MHz, the voluntariness of the distance D is at the cycle of 3 meters (m). For example, when the modulation frequency is at 12.5 MHz, the voluntariness of the distance D is at the cycle of 12 m.

As depicted in FIG. 4, in the high dynamic range measurement that is performed a plurality of times, the results of measurement are included in the region bounded by the curve 1 and the curve 3. In such a configuration, the distance to the object is less than 12 m. Accordingly, when the modulation frequency of, for example, 12.5 MHz is adopted, aliasing can be prevented from occurring.

However, when it is desired that the distance be measured with a high degree of precision, the modulation frequency of about 12.5 MHz is insufficient. As described above with reference to FIG. 3, in order to satisfy the condition that the variations in distance value is equal to or smaller than the threshold, i.e., 40 millimeters (mm), the measurement needs to be performed at the radiation intensity of received light of 100 to 1000 LSB with the modulation frequency of 50 MHz. In such a configuration, aliasing may occur in a cycle of 3 m.

In order to handle such a technical problem, for example, the measurement with the modulation frequency of 12.5 MHz may additionally be performed. When the measurement according to the present embodiment is based on the high dynamic range measurement that is performed a plurality of times, as will be described later in detail, the measurement is typically performed with variable modulation frequencies under the condition that the exposure time is the same. In the present embodiment, the exposure time indicates the length of time during which the light emitter 10 emits the modulated light with a predetermined frequency and measurement is completed one time.

First Time: Measurement is performed at the modulation frequency of 50 MHz for the exposure time of 1 msec.

Second Time: Measurement is performed at the modulation frequency of 50 MHz for the exposure time of 0.1 msec.

Third Time: Measurement is performed at the modulation frequency of 12.5 MHz for the exposure time of 1 msec.

Fourth Time: Measurement is performed at the modulation frequency of 12.5 MHz for the exposure time of 0.1 msec.

However, in the present embodiment, the measurement at a low frequency is performed only one time to avoid aliasing. Alternatively, the measurement at a low frequency may be performed a plurality of times, but the number of times the measurement at a low frequency is performed needs to be smaller than the number of times the measurement is performed at a high frequency. In particular, measurement is performed as follows.

First Time: Measurement is performed at the modulation frequency of 50 MHz for the exposure time of 1 msec.

Second Time: Measurement is performed at the modulation frequency of 50 MHz for the exposure time of 0.1 msec.

Third Time: Measurement is performed at the modulation frequency of 12.5 MHz for the exposure time of 0.8 msec.

In the measurement that is performed for the third time at a low frequency, it is desired that the exposure time takes a value greater than one of the exposure time of the measurement that is performed for the first time at a high frequency and the exposure time of the measurement that is performed for second first time at a high frequency, and it is desired that the exposure time takes a value smaller than the other one of the exposure time of the measurement that is performed for the first time at a high frequency and the exposure time of the measurement that is performed for second first time at a high frequency. Moreover, in the measurement that is performed for the third time, the data in the region in which the radiation intensity of received light is 80 to 1000 LSB is used as valid data. The data that is obtained in the third measurement is used to avoid aliasing, and it is satisfactory as long as to what cycle of 3 m cycles in the measurement that is performed for the first time and the second time the data that is obtained in the third measurement belong can be determined. Accordingly, a desired level of precision for the measurement is not so high. For example, it is satisfactory as long as the maximum value of the variations in distance value is less than 3 m. Accordingly, the data of the radiation intensity of received lighthat is smaller than the lower-limit radiation intensity of received light for the measurement with a high degree of precision is used.

A curve 1 in FIG. 5 indicates the conditions for the lower-limit radiation intensity of received light to be 80 LSB in the measurement that is performed for the third time, and the conditions for the lower-limit radiation intensity of received light to be 80 LSB in the measurement that is performed for the third time are equivalent to the conditions for the radiation intensity of received light to be 100 LSB in the measurement that is performed for the first time. A curve 4 in FIG. 5 indicates the conditions for the maximum radiation intensity of received light to be 1000 LSB. In other words, the result of the measurement that is performed for the third time is included in the region bounded by the curve 1 and the curve 4.

As described above, the region that is bounded by the curve 1 and the curve 3 indicates the range in the measurement that is performed for the first time and the second time. As a result, the measurement that is performed for the third time fails to cover the region bounded by the curve 3 and the curve 4, and the radiation intensity of received light unintentionally exceeds 1000 LSB and reaches a level of saturation. However, such a region corresponds to the range that is less than 3 m. In other words, it is understood that, when the data of the radiation intensity of received light in the measurement that is performed for the third time has reached a level of saturation, the distance to the object is shorter than 3 m. In the measurement that is performed for the first time and the second time, the cycle of aliasing is 3 m. For this reason, if it is understood that the distance to the object is shorter than 3 m, aliasing can be avoided, and the distance to the object can be determined.

The relation between radiation intensity of received light and the variations in value of distance measurement in the third measurement procedure is described below with reference to FIG. 6.

Figure 6:
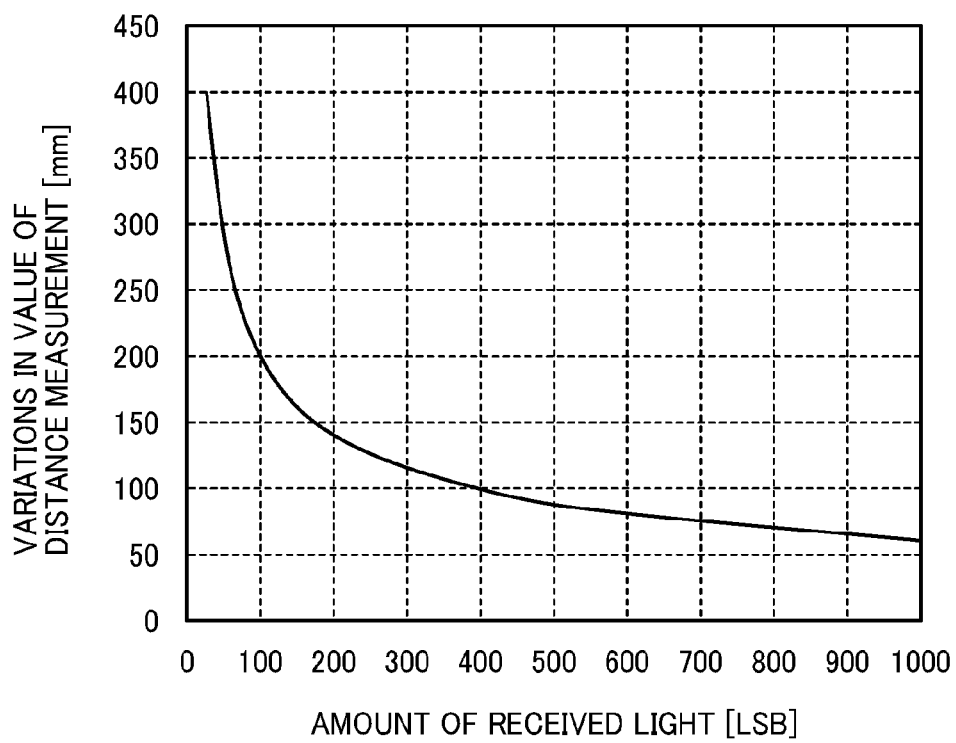
FIG. 6 is a diagram illustrating the relation between radiation intensity of received light and the variations in value of distance measurement in the third measurement procedure, according to an embodiment of the present disclosure.

FIG. 6 is a diagram illustrating the relation between radiation intensity of received light and the variations in value of distance measurement in the third measurement procedure, according to the present embodiment.

The modulation frequency is at 12.5 MHz when the measurement performed for the third time. Accordingly, the variations in value of distance measurement may increase by four times compared with the measurement performed for the first time and the second time where the modulation frequency is at 50 MHz. Such a situation is illustrated in the graph of FIG. 6. Referring to the graph of FIG. 6, it is understood that, when the lower-limit radiation intensity is 80 LSB, the variations in distance is about 220 mm Such variations in distance provides sufficient precision to identify one of a plurality of distance candidates in the cycles of 3 m.

In the region in which the radiation intensity of received light is greater than 80 LSB, the variations in value of distance measurement are sufficiently small. Accordingly, it is understood that the precision of the measurement in range from 80 to 1000 LSB is sufficient to avoid aliasing.

As described above, it is understood that, when the radiation intensity of received light unintentionally exceeds 1000 LSB and reaches a level of saturation, the results of measurement are included in the region bounded by the curve 3 and the curve 4 as illustrated in FIG. 5. As the range is less than 3 m, one of a plurality of distance candidates in the cycles of 3 m, which is uniquely shorter than 3 m, can be identified.

In the embodiments described above, the exposure time or irradiation time of the measurement that is performed for the first time at a high frequency and the exposure time or irradiation time of the measurement that is performed for the second time at a high frequency are differentiated from each other. Alternatively, it may be configured such that the irradiation time or exposure time of one-time measurement is set to be constant and the measurement is performed a number of times. Due to such a configuration, a similar effect can be achieved. Such an alternative embodiment of the present disclosure is described below in detail.

In the case of the present embodiment, a vertical-cavity surface-emitting laser (VCSEL) two-dimensional array using semiconductor laser is used as the light emitter 10. The continuous irradiation time during which the light emitter 10 that adopts such semiconductor laser can emit the modulated light with stable radiation intensity of light may be limited due to various kinds of factors.

In particular, when the light emitter 10 continuously emits light for a long time, the radiation intensity of light may vary due to the amount of heat generated by the light emitter 10 itself and the precision of the measurement may deteriorate. Moreover, the one-time measurement time may be restricted due to, for example, the scale of the computation circuitry of the controller 30. In order to handle such a situation, it is configured in the present embodiment that the irradiation time of one-time measurement is set to be constant and the measurement is performed a plurality of times.

For example, if the length of time during which the light emitter 10 can continuously emit light with stability in one-time measurement is 0.5 msec, the controller 30 performs measurement control as follows.

First Time: Measurement is performed at the modulation frequency of 50 MHz for the irradiation time of 0.5 msec.

Second Time: Measurement is performed at the modulation frequency of 50 MHz for the irradiation time of 0.5 msec.

Third Time: Measurement is performed at the modulation frequency of 50 MHz for the irradiation time of 0.1 msec.

Fourth Time: Measurement is performed at the modulation frequency of 12.5 MHz for the irradiation time of 0.4 msec.

Fifth Time: Measurement is performed at the modulation frequency of 12.5 MHz for the irradiation time of 0.4 msec.

In the present specific embodiment, the measurement that is performed for the first time to the third time corresponds to the first measurement in which the modulation frequency is high frequency, and the measurement that is performed for the fourth time and the fifth time corresponds to the second measurement in which the modulation frequency is low frequency. Between each pair of the measurement that is performed for the first time to the measurement that is performed for the fifth time, a down time may be arranged such that the temperature or the like of the light emitter 10 will be stabilized.

The controller 30 according to the present embodiment adds up the first result of measurement of radiation intensity of received light and the second result of measurement of radiation intensity of received light. Due to such a configuration, results of measurement that are similar to the results of measurement result that are obtained when the measurement is performed at the modulation frequency of 50 MHz for the irradiation time of 1.0 msec can be obtained. In a similar manner to the above, the controller 30 according to the present embodiment adds up the fourth result of measurement of radiation intensity of received light and the fifth result of measurement of radiation intensity of received light. Due to such a configuration, results of measurement that are equivalent to the results of measurement that are obtained when the measurement is performed for the irradiation time of 0.8 msec can be obtained. As described above, averaging may be performed on a plurality of measurement results in order to reduce the overall variations in measurement value.

As described above, the irradiation time of one-time measurement is set to be equal to or shorter than the continuous irradiation time during which the light emitter 10 can emit the modulated light with stable radiation intensity of light. As a result, the measurement can be performed with stable exposure dose. Further, the precision of the measurement that are equivalent to the precision of the measurement when the irradiation time is extended by performing add operation on a plurality of measurement results can be obtained, and the aliasing can be reduced.

Further, the irradiation time in the measurement where the modulation frequency is as high as 50 MHz and the irradiation time in the measurement where the modulation frequency is as low as 12.5 MHz can be made equivalent to each other. For example, measurement may be performed as follows.

First Time to Tenth Time: Measurement is performed at the modulation frequency of 50 MHz for the irradiation time of 0.1 msec.

Eleventh Time: Measurement is performed at the modulation frequency of 50 MHz for the irradiation time of 0.1 msec.

Twelfth Time to Nineteenth Time: Measurement is performed at the modulation frequency of 12.5 MHz for the irradiation time of 0.1 msec.

As the irradiation time of all the measurement that is performed the first time to the nineteenth time is made all 0.1 msec, the conditions for driving the light emitter 10 can be made equal to each other. In such a configuration, the amount of heat generation can be maintained at a constant amount, and the light can be emitted with stable radiation intensity of light. In the present specific embodiment, the measurement that is performed for the first time to the tenth time and the measurement that is performed for the eleventh time, i.e., the measurement that is performed eleven times, correspond to the first measurement, and the measurement that is performed for the twelfth time to the nineteenth time, i.e., the measurement that is performed eight times, correspond to the second measurement.

The controller 30 according to the present embodiment obtains and adds up the radiation intensity of received light from the light receiver 20 each time the measurement that is performed for the first time to the tenth time. As a result, the added-up radiation intensity of received light can be obtained. In a similar manner to the above, the controller 30 according to the present embodiment obtains the radiation intensity of received light from the light receiver 20 each time the measurement that is performed for the twelfth time to the nineteenth time, and obtains the added-up radiation intensity of received light. The controller 30 measures the time difference between the time of emission and the time of light reception based on such added-up radiation intensity of received light, and calculates the value of the distance based on the measured length of time. Although the irradiation time and the exposure time in one-time measurement is as short as 0.1 milliseconds (msec), the radiation intensities of received light may be added up such that the variations in measurement value in the measurement that is performed for the first time to the tenth time will be made equivalent to that of the measurement that is performed for the irradiation time of 1 msec. The variations in measurement value in the measurement that is performed for the twelfth to nineteenth times can be made equivalent to that of the measurement that is performed for the irradiation time of 0.8 msec.

The procedure of calculating a distance based on a result of measurement with a high degree of precision is described below with reference to FIG. 7. FIG. 7 is a diagram illustrating the procedure of calculating a distance based on a result of measurement with a high degree of accuracy, according to the present embodiment.

In the present embodiment, the procedure is supposed to be executed upon completion of the measurement that is performed for the first time, the measurement that is performed for the second time, and the measurement that is performed for the third time. However, the procedure may start before all the measurement is completed.

In a step S1, the controller 30 of the distance-measuring apparatus 1 computes a plurality of distance candidates and periodicity based on measurement data obtained in the measurement performed for the first time and second time. Note also that the controller 30 may adopt the distance calculation formulae of the phase detection TOF camera known in the art. The distinction between the measurement data obtained in the measurement performed for the first time and the measurement data obtained in the measurement performed for the second time may be made as follows. If the data of the radiation intensity of received light in the measurement that is performed for the first time with a relatively long exposure time has reached the level of saturation, the measurement data that is obtained in the measurement performed for the second time may be used.

In a step S2, the controller 30 determines whether the result of the measurement for the third time has reached the level of saturation. When it is determined that the result of the measurement for the third time has reached the level of saturation ("YES" in the step S2), in a step S3, the distance-measuring apparatus 1 may adopt the distance candidate in the first cycle as an appropriate distance, and the process is terminated. This is because, when it is determined that the result of the measurement that is performed for the third time has reached the level of saturation, it can be determined that the result of the measurement is included in the range that is shorter than 3 m.

When it is determined that the result of the measurement for the third time does not reach the level of saturation ("NO" in the step S2), in a step S4, the controller 30 calculates the distance to the object based on the measurement data obtained for the third time. As it is already known that the distance-measuring apparatus 1 according to the present embodiment has a cycle of 12 m and an object whose reflectance ratio is less than 100% and distance has successfully been measured certainly exists within range of 12 m, the distance with no indistinguishability or ambiguity due to periodicity can be obtained. However, the precision of the measurement is not very high as the modulation frequency is low.

In a step S5, the controller 30 adopts one of the multiple distance candidates obtained in the step S1 closest to the distance obtained in the step S4 as an appropriate distance. Due to the configurations as described above, the distance-measuring apparatus 1 according to the present embodiment can avoid the aliasing of the distance obtained in the step S1.

As described above, the distance-measuring apparatus 1 according to the present embodiment adopts a pair of modes including a high-frequency modulation mode and a low-frequency modulation mode, and performs measurement a plurality of times with variable exposure time or intensity of light in the high-frequency modulation mode. Moreover, in the low-frequency modulation mode, measurement is performed for an exposure time longer than the maximum exposure time in the high-frequency modulation mode. Alternatively, in the low-frequency modulation mode, measurement is performed with radiation intensity of light higher than the maximum radiation intensity of light. Due to such configurations as described above, both reduction in aliasing and increment in dynamic range can be achieved.

Moreover, the distance-measuring apparatus 1 according to the present embodiment changes the exposure time while performing measurement a plurality of times at the first modulation frequency. Due to such a configuration, measurement can be performed with increased dynamic range.

Moreover, when measurement is performed a plurality of times at the first modulation frequency, the distance-measuring apparatus 1 according to the present embodiment can perform distance measurement at least two times upon fixing the exposure time to the maximum value the distance-measuring apparatus 1 can take. Due to such a configuration, although the dynamic range cannot effectively be increased, the maximum distance can be extended.

When the distance-measuring apparatus 1 according to the present embodiment performs distance measurement with the second modulation frequency, the exposure time is equal to or shorter than the maximum exposure time but is longer than the minimum exposure time among a plurality of distance measurements performed with the first modulation frequency. Due to such a configuration, the data that is used to avoid aliasing can be obtained from a plurality of distance-measurement results, and an intermediate exposure time can be obtained.

Moreover, the distance-measuring apparatus 1 according to the present embodiment performs aliasing avoidance on the distance measurement data obtained using the first modulation frequency based on information as to whether the radiation intensity of received light has reached a level of saturation in the distance measurement data obtained using the second modulation frequency. Due to such a configuration, some of the aliasing avoidance can be performed based on information as to whether the radiation intensity of received light has reached a level of saturation in the distance measurement data.

In the distance-measuring apparatus 1 according to the present embodiment, the lower-limit radiation intensity is set to the distance measurement that is performed a plurality of times. It is determined that measurement data is valid when the radiation intensity of received light is equal to or greater than the lower-limit radiation intensity, and the lower-limit radiation intensity in the second modulation frequency is smaller than the lower-limit radiation intensity in the irst modulation frequency. Due to such a configuration, it is not necessary to obtain the data that is used to avoid aliasing with a high degree of accuracy. Accordingly, the lower-limit radiation intensity can be reduced, and measurement can be performed with increased dynamic range.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. For example, some of the elements described in the above embodiments may be removed. Further, elements according to varying embodiments or modifications may be combined as appropriate.

Any one of the above-described operations may be performed in various other ways, for example, in an order different from the one described above. Each of the functions of the described embodiments may be implemented by one or more processing circuits or circuitry.

Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority to Japanese Patent Application Nos. 2020-48495 and 2021-006693, filed on Mar. 18, 2020, and Jan. 19, 2021, respectively, in the Japan Patent Office, the entire disclosures of which are hereby incorporated by reference herein.

REFERENCE SIGNS LIST

1 Distance-measuring apparatus
10 Light emitter
20 Light receiver
30 Controller

The invention claimed is:

1. A distance-measuring apparatus, comprising:
a light emitter configured to emit light with modulated frequency to an object;
a light receiver configured to receive the light that is emitted from the light emitter and returns as reflected by the object; and
control circuitry configured to measure, based on radiation intensity of received light by the light receiver, a length of time between a time at which the light is emitted by the light emitter and a time at which the light is received by the light receiver to obtain a distance to the object,
wherein the control circuitry is configured to perform a first measurement in which the light emitter emits the light at a first modulation frequency to measure the length of time by the time at which the light is received by the light receiver a first plurality of times,
wherein the control circuitry is configured to perform a second measurement in which the light emitter emits the light at a second modulation frequency lower than the first modulation frequency to measure the length of time by the time at which the light is received by the light receiver a second plurality of times fewer than the first plurality of times, and
wherein the control circuitry is configured to calculate the distance to the object based on the length of time obtained in the first measurement and the length of time obtained in the second measurement.

2. The distance-measuring apparatus according to claim 1, wherein the first measurement includes measurement in which the light emitter emits the light at the first modulation frequency for a first irradiation time and measurement in which the light emitter emits the light at the first modulation frequency for a second irradiation time longer than the first irradiation time,
wherein the second measurement includes measurement in which the light emitter emits the light at the second modulation frequency for a third irradiation time, and
wherein the third irradiation time is longer than the first irradiation time and is shorter than the second irradiation time.

3. The distance-measuring apparatus according to claim 1, wherein the first measurement includes measurement in which the light emitter emits the light at the first modulation frequency for a first irradiation time, and
wherein the measurement is performed a plurality of times.

4. The distance-measuring apparatus according to claim 1, wherein the second measurement includes measurement in which the light emitter emits the light at the second modulation frequency for a third irradiation time, and
wherein the measurement is performed a plurality of times.

5. The distance-measuring apparatus according to claim 1, wherein the first measurement includes measurement in which the light emitter emits the light at the first modulation frequency for a first irradiation time, wherein the measurement is performed a plurality of times, wherein the first measurement includes measurement in which the light emitter emits the light at the first modulation frequency for a second irradiation time shorter than the first irradiation time, wherein the second measurement includes measurement in which the light emitter emits the light at the second modulation frequency for a third irradiation time, and wherein the third irradiation time is equivalent to the first irradiation time or the second irradiation time.

6. The distance-measuring apparatus according to claim 3, wherein the control circuitry is configured to, in the first measurement, obtain the radiation intensity of received light from the light receiver for the first irradiation time every time the measurement in which the light emitter emits the light at the first modulation frequency for the first irradiation time is performed, wherein the control circuitry is configured to, in the first measurement, add up the radiation intensity of received light every time the measurement in which the light emitter emits the light at the first modulation frequency for the first irradiation time is performed, and wherein the control circuitry is configured to, in the first measurement, measure the time between the time at which the light is emitted by the light emitter and the time at which the light is received by the light receiver, based on the added-up radiation intensity of received light.

7. The distance-measuring apparatus according to claim 1, wherein the control circuitry is configured to process data obtained in the first measurement to avoid aliasing based on information as to whether the radiation intensity of received light by the light receiver has reached a level of saturation in the second measurement.

8. The distance-measuring apparatus according to claim 1, wherein the control circuitry is configured to determine that measurement data is valid when the radiation intensity of received light by the light receiver is equal to or greater than a lower-limit radiation intensity in the first measurement and the second measurement, and wherein the lower-limit radiation intensity in the second measurement is smaller than the lower-limit radiation intensity in the first measurement.

9. A method of measuring a distance, the method comprising:

emitting light at a first modulation frequency to measure a length of time to receive the light reflected by an object a first plurality of times as a first measurement;

emitting the light at a second modulation frequency lower than the first modulation frequency to measure the length of time to receive the light reflected by the object a second plurality of times fewer than the first plurality of times as a second measurement; and calculating the distance to the object based on the length of time obtained in the first measurement and the length of time obtained in the second measurement.

10. The method according to claim 9, wherein the emitting the light at the first modulation frequency includes emitting the light at the first modulation frequency for a first irradiation time and emitting the light at the first modulation frequency for a second irradiation time longer than the first irradiation time, wherein the emitting the light at the second modulation frequency includes emitting the light at the second modulation frequency for a third irradiation time, and wherein the third irradiation time is longer than the first irradiation time and is shorter than the second irradiation time.

11. The method according to claim 9, wherein the emitting the light at the first modulation frequency includes emitting the light for a first irradiation time a plurality of times and emitting the light at the first modulation frequency for a second irradiation time shorter than the first irradiation time, wherein the emitting the light at the second modulation frequency includes emitting the light for a third irradiation time, and wherein the third irradiation time is equivalent to the first irradiation time or the second irradiation time.

12. A non-transitory computer readable medium storing instructions which when executed by a processor perform the method of claim 9.

* * * * *